P. PEBELIER.
VEHICLE SIGNAL DEVICE.
APPLICATION FILED JULY 23, 1917.
1,266,043.
Patented May 14, 1918.
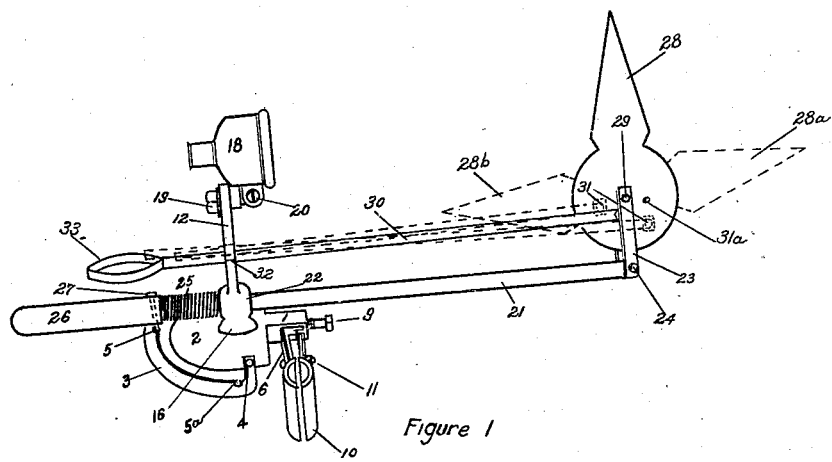
Figure 1.
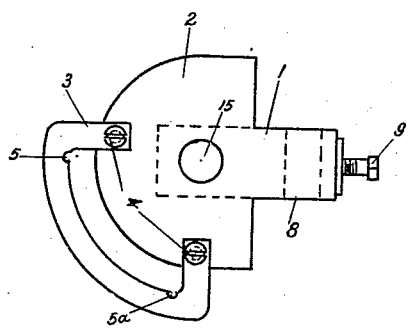
Figure 2.
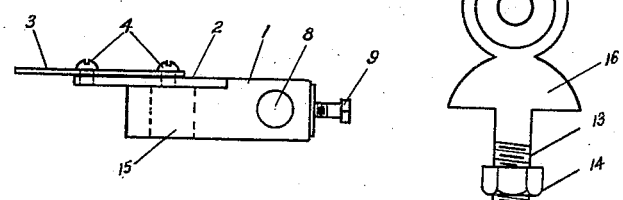
Figure 3.
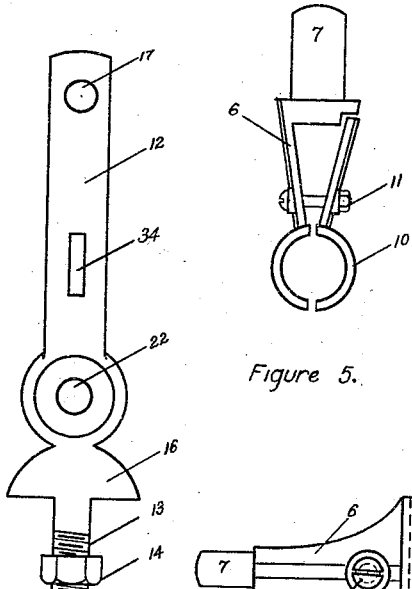
Figure 4.
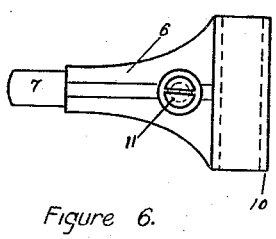
Figure 5.
Figure 6.
WITNESSES.
M. J. Selaya
E. H. Oberg.
INVENTOR.
Paul Pebelier.
BY P. C. Bates
ATTORNEY

UNITED STATES PATENT OFFICE.

PAUL PEBELIER, OF SAN JOSE, CALIFORNIA.

VEHICLE-SIGNAL DEVICE.

1,266,043.  Specification of Letters Patent.  Patented May 14, 1918.

Application filed July 23, 1917. Serial No. 182,303.

*To all whom it may concern:*

Be it known that I, PAUL PEBELIER, a citizen of the United States, residing at San Jose, in the county of Santa Clara and State of California, have invented certain new and useful Improvements in Vehicle-Signal Devices, of which the following is a specification.

My invention relates to improvements in vehicle signal device, and more particularly to an improved vehicle signal device having a lamp attached thereto, adapted to illuminate the signal and turnable with the signal device, showing at night the direction the vehicle is to turn or stop as the case may be.

A further object is to so construct a signal device of this character that will show the signal night or day from the front and rear at the same time for either direction required.

The above and additional objects are accomplished by such means as are illustrated in the accompanying drawings, described in the following specification, and then more particularly pointed out in the claims which are appended hereto and form a part of this application.

With reference to the drawings, wherein I have illustrated the preferred embodiment of my invention, as it is reduced to practice, and throughout the several views of which similar reference numerals designate corresponding parts:

Figure 1 is a perspective view of my vehicle signal device assembled, showing means of attaching the device to a vehicle, with electric lamp in position.

Fig. 2 is a plan view of the stanchion support with quadrant attached thereto.

Fig. 3 is a front view of Fig. 2.

Fig. 4 is a front view of the metal stanchion showing openings through which the operating rods pass, and opening by which the electric lamp is attached thereto, and lower means by which the stanchion is fastened to metal stanchion support.

Fig. 5 is a plan view of the clasp coupling by which the signal device is attached to a vehicle.

Fig. 6 is a side view of Fig. 5.

Proceeding now to the description of the drawings, the numeral 1 designates the metal stanchion support, plate 2 being an integral part thereof, having quadrant 3 attached thereto by screws 4, quadrant 3 having notches 5 and 5ª cut therein. Clasp coupling is shown at 6 connected to metal stanchion support 1 by shank 7 passing through opening 8, and is held in place by set screw 9. The clamping portion of clasp coupling 6 is shown at 10, the same being adjusted by set bolt 11. Metal stanchion is shown at 12, connected to metal stanchion support 1 by stud 13 and adjusted thereto by nut 14, said stud 13 passing through opening 15 in metal stanchion support 1 and is turnable therein. Flange 16 is shown resting on plate 2 and is turnable thereon. Opening 17 is shown in metal stanchion 12 through which electric lamp 18 is fastened by stud 19, electric lamp 18 being adjustable on stud 19, by screw 20. Lower operating rod is shown at 21 passing through opening 22 a distance, on the outer end thereof is shown metal yoke 23 fastened to the end of rod 21 by set screw 24. At the inner end of rod 21 is shown tension spring 25, resting on rod 21 between stanchion 12 and handle 26, handle 26 being fastened to the inner end of rod 21 by pin 27, said pin 27 extending through handle 26 a distance and engaging with notches 5 and 5ª in quadrant 3. Signal is shown in three positions in Fig. 1, 28 being the neutral position. 28ª as shown in dotted lines denotes the signal pointing to the left. 28ᵇ as shown in dotted lines denotes the signal pointing to the right. The signal is fulcrumed at the upper end of metal yoke 23 by fulcrum pin 29, and is operated by metal rod 30, connected to signal 28 by crank pin 31, stop pin is shown on signal 28 at 31ª. A notch is shown in metal rod 30 at 32. On the outer end of metal rod 30, is shown operating handle 33, metal rod 30, operates through opening 34, in metal stanchion 12.

The operation of my vehicle signal device is as follows: The device being fastened to the frame of a wind-shield of an automobile at the left-hand side of the operator by clasp coupling 6 and clamping portion 10, and bolt 11; to display signal 28, rise up on handle 26 and press the same forward a distance against spring 25 until the pin 27 is disengaged from notch 5 in quadrant 3, then move handle around to the right until pin 27 drops into notch 5ª. This will expose the signal front and rear at the side of the vehicle, when signal 28 points up as it does when in neutral. This denotes that the vehicle is going to stop. Should the operator wish to turn to the left he rises rod 30 up by handle 33 a distance out of notch 32 and draws rod 30 back until stop pin 31ª strikes metal yoke 23, showing the signal 28 in position of 28ª.

When the operator wishes to turn to the right and the signal is in neutral position he rises rod 30 up by handle 33 out of notch 32 and pushes rod 30 outward until stop pin 31ª strikes metal yoke 23, showing the signal 28 in position of 28ᵇ. The electric lamp 18 is adapted to shine on the signal at night when the same is displayed. When there is no signal to be shown the operator will press in on handle 26 until pin 27 disengages notch 5ª, and turn handle 26 back until pin 27 engages notch 5; which brings the signal around to the front in the same line that the vehicle is traveling, which stops the exposure of the signal from front and rear.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus described my invention, what I claim as new and desire to secure by Letters Patent is:—

1. In a vehicle signal device the combination of a metal stanchion support, a clasp attached to said stanchion support, adapted to be clamped to a wind shield of an automobile; a quadrant attached to said stanchion support; notches in said quadrant; a metal stanchion turnably secured to the metal stanchion support and concentric with said quadrant; a bore through the lower part of the stanchion; a rod passing through said bore a distance on both sides of said stanchion and solidly fastened therein; a handle slidably secured to one end of said rod; a pin through said handle and rod, adapted to limit the sliding movement of the handle and to engage said notches in the quadrant; a tension spring adapted to resiliently engage said handle, whereby the pin may be manually released from engagement with said notches and the stanchion turned through a predetermined arc and held in these positions by said pin and notches; an opening in the upper end of the stanchion for fastening a lamp bracket thereto; substantially as set forth.

2. In a vehicle signal device, the combination of a metal stanchion support, a metal clasp attached to said stanchion support, adapted to be clamped to a windshield of an automobile; a quadrant attached to said stanchion support; notches in said quadrant; a metal stanchion turnably secured to the metal stanchion support and concentric with said quadrant; a bore through the lower part of the stanchion; a rod passing through said bore and extending a distance on both sides of said stanchion and solidly fastened therein; a signal fulcrumed at the outer end of said rod; means for manually operating said signal whereby the signal may be pointed to the right, left or upward, and means for holding said signal in said positions; a handle slidably secured to the inner end of said rod; a pin through said handle and rod, adapted to limit the sliding movement of the handle and to engage the notches in the quadrant; a tension spring, positioned between the handle and the stanchion, whereby the pin may be manually released from engagement with said notches and the stanchion turned through a predetermined arc and held in these positions by said pin and notches; an opening in the upper end of the stanchion, for fastening a lamp bracket thereto, substantially as set forth.

In testimony whereof I have signed my name to this specification in the presence of two subscribing witnesses.

PAUL PEBELIER.

Witnesses:
 M. J. SELAYA,
 JOHN W. SULLIVAN.

Copies of this patent may be obtained for five cents each, by addressing the "Commissioner of Patents, Washington, D. C."